United States Patent
Kanda et al.

(10) Patent No.: US 7,653,256 B2
(45) Date of Patent: Jan. 26, 2010

(54) METHOD OF EVALUATING IMAGE INFORMATION, STORAGE MEDIUM, AND IMAGE-INFORMATION EVALUATING APPARATUS

(75) Inventors: Megumi Kanda, Tokyo (JP); Eunice Poon, Ontario (CA); Ian Clarke, Ontario (CA)

(73) Assignee: Seiko Epson Corporation, Tokyo (JP)

( * ) Notice: Subject to any disclaimer, the term of this patent is extended or adjusted under 35 U.S.C. 154(b) by 655 days.

(21) Appl. No.: 11/283,669

(22) Filed: Nov. 22, 2005

(65) Prior Publication Data

US 2006/0188170 A1 Aug. 24, 2006

(30) Foreign Application Priority Data

Dec. 13, 2004 (JP) ............................. 2004-359693

(51) Int. Cl.
G06K 9/40 (2006.01)
(52) U.S. Cl. .................................................. 382/255
(58) Field of Classification Search ........................ None
See application file for complete search history.

(56) References Cited

U.S. PATENT DOCUMENTS 5,598,481 A * 1/1997 Nishikawa et al. .......... 382/130
5,710,829 A * 1/1998 Chen et al. .................. 382/173
6,154,574 A * 11/2000 Paik et al. ................... 382/255

OTHER PUBLICATIONS

P. Marziliano, F. Dufaux, S. Winkler and T. Ebrahimi, "A No-Reference Perceptual Blur Metric" in Proceedings IEEE Conference on Image Processing, Sep. 2002.
I. Rekleitis, "Optical Flow Recognition from the Power Spectrum of a Single Blurred Image" in Proceedings IEEE International Conference on Image Processing, Switzerland, Sep. 1996.

* cited by examiner

*Primary Examiner*—Matthew C Bella
*Assistant Examiner*—Alex Liew
(74) *Attorney, Agent, or Firm*—Sughrue Mion, PLLC

(57) ABSTRACT

The present method of evaluating image information, includes: extracting, from image information to be evaluated, a plurality of edge pixels located in a boundary of an image expressed by the image information; calculating, for each of the edge pixels, a number of pixels that include the edge pixel targeted for calculation, that exist in the boundary, and that are arranged in a direction intersecting with the boundary; and performing out-of-focus blurring evaluation of the image information on the basis of the number of pixels that exist in the boundary and a number of the edge pixels.

10 Claims, 14 Drawing Sheets

| -1 | 0 | 1 |
|----|---|---|
| -2 | 0 | 2 |
| -1 | 0 | 1 |

Fig. 8A

| -1 | -2 | -1 |
|----|----|----|
| 0  | 0  | 0  |
| 1  | 2  | 1  |

Fig. 8B

| P(i-1, j-1) Y(i-1, j-1) | P(i, j-1) Y(i, j-1) | P(i+1, j-1) Y(i+1, j-1) |
|---|---|---|
| P(i-1, j) Y(i-1, j) | P(i, j) Y(i, j) | P(i+1, j) Y(i+1, j) |
| P(i-1, j+1) Y(i-1, j+1) | P(i, j+1) Y(i, j+1) | P(i+1, j+1) Y(i+1, j+1) |

Fig. 8C original image      One-Dimensional Plot average edge width = 8.2 pixel units. Blur Measure = 6 original image      One-Dimensional Plot average edge width = 4.4 pixel units. Blur Measure = 3

US 7,653,256 B2

METHOD OF EVALUATING IMAGE INFORMATION, STORAGE MEDIUM, AND IMAGE-INFORMATION EVALUATING APPARATUS

CROSS-REFERENCES TO RELATED APPLICATIONS

This application claims priority on Japanese Patent Application No. 2004-359693 filed Dec. 13, 2004, which is herein incorporated by reference.

BACKGROUND

1. Technical Field

The present invention relates to methods of evaluating image information, storage media, and image-information evaluating apparatuses.

2. Related Art

When photographing is performed in an out-of-focus state, the photographed image becomes blurred. However, since a liquid crystal display section attached to a printer or a liquid crystal display section of a digital camera, for example, has a small screen, it is not easy for a user to visually evaluate an image displayed on the liquid crystal display section.

Thus, it is proposed to automatically evaluate image information using a computer (e.g., (1) P. Marziliano, F. Dufaux, S. Winkler and T. Ebrahimi, "A No-Reference Perceptual Blur Metric," in Proceedings IEEE International Conference on Image Processing, September 2002, (2) I. Rekleitis, "Optical Flow Recognition from the Power Spectrum of a Single Blurred Image," in Proceedings IEEE International Conference on Image Processing, Switzerland, September 1996).

SUMMARY

It is an object of the invention to improve accuracy of out-of-focus blurring evaluation. It is another object of the invention to perform out-of-focus blurring evaluation with high accuracy even on an image in which the darkness around an edge gently changes because the contour of a subject itself is not clear.

A first principal invention for attaining the objects includes: extracting, from image information to be evaluated, a plurality of edge pixels located in a boundary of an image expressed by the image information; calculating, for each of the edge pixels, a number of pixels that include the edge pixel targeted for calculation, that exist in the boundary, and that are arranged in a direction intersecting with the boundary; and performing out-of-focus blurring evaluation of the image information on the basis of the number of pixels that exist in the boundary and a number of the edge pixels.

A second principal invention for attaining the objects includes: extracting, from image information to be evaluated, an edge pixel located in a boundary of an image expressed by the image information; extracting two pixels sandwiching the edge pixel in a direction intersecting with the boundary, a difference in luminance between each of the two pixels and a pixel adjacent thereto being the largest; and performing out-of-focus blurring evaluation of the image information on the basis of a distance between the two pixels.

Other characteristics of the invention will be made clear from the descriptions of this specification and attached drawings.

BRIEF DESCRIPTION OF THE DRAWINGS

FIG. 8A is a diagram illustrating a Sobel filter in an X direction, FIG. 8B is a diagram illustrating a Sobel filter in a Y direction, and FIG. 8C is a schematic diagram illustrating a range of 3×3 pixels around a certain pixel $P(i,j)$ and a luminance Y of a pixel P in this range;

DESCRIPTION OF EXEMPLARY EMBODIMENTS

Figure 1:
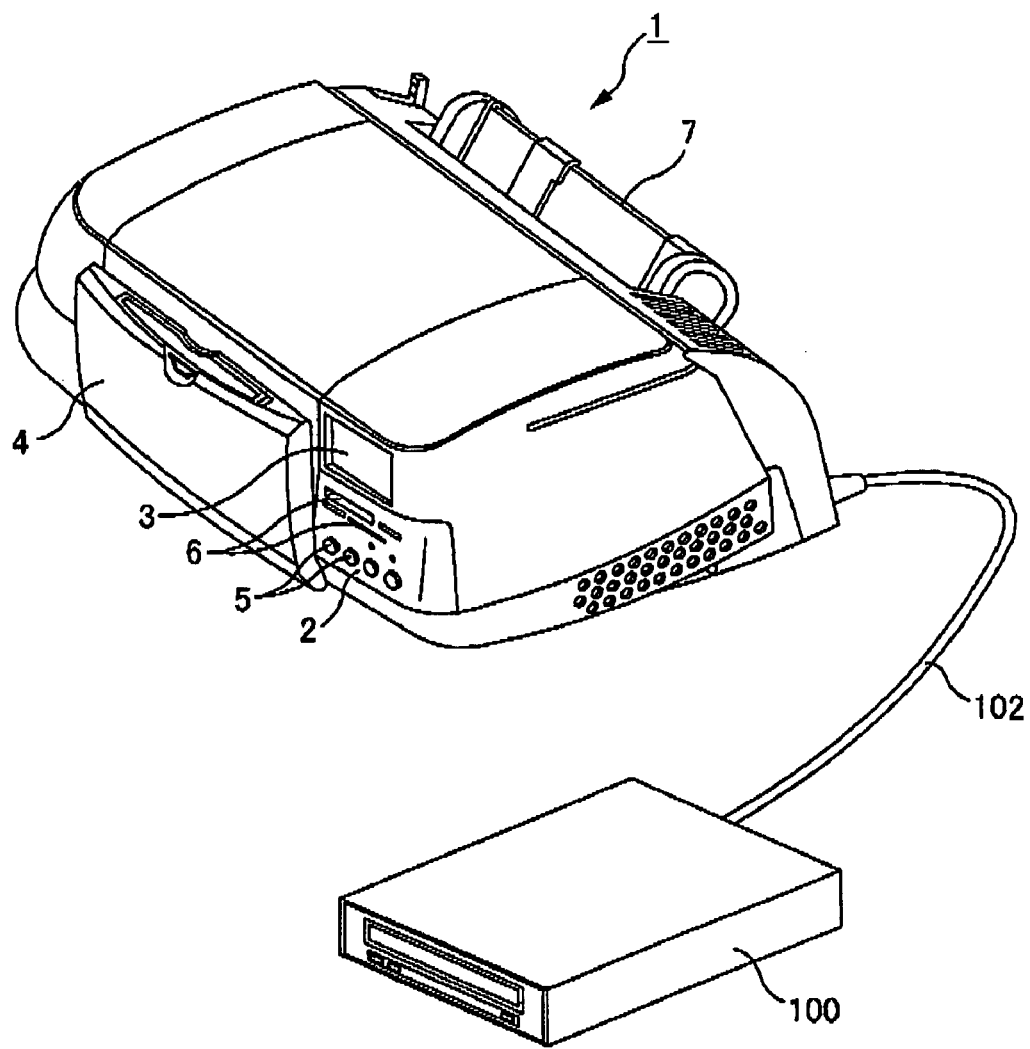
FIG. 1 is a diagram illustrating external appearances of a printer 1 and a CD-R device 100 connected to this printer 1.

At least the following matters are made clear from the description of this specification and the accompanying drawings.

A method of evaluating image information, includes:

extracting, from image information to be evaluated, a plurality of edge pixels located in a boundary of an image expressed by the image information;

calculating, for each of the edge pixels, a number of pixels that include the edge pixel targeted for calculation, that exist in the boundary, and that are arranged in a direction intersecting with the boundary; and performing out-of-focus blurring evaluation of the image information on the basis of the number of pixels that exist in the boundary and a number of the edge pixels.

According to such an evaluating method, it is possible to accurately perform the out-of-focus blurring evaluation.

Preferably, the evaluating method further includes: extracting two pixels sandwiching each of the edge pixels in the direction intersecting with the boundary, the two pixels having an extreme value of a luminance among pixels arranged in the direction intersecting with the boundary; and calculating the number of pixels that exist in the boundary on the basis of a distance between the two pixels. This makes it possible to calculate an edge width.

Preferably, the evaluating method further includes: extracting two pixels sandwiching each of the edge pixels in the direction intersecting with the boundary, a difference in luminance between each of the two pixels and a pixel adjacent thereto being the largest; and calculating the number of pixels that exist in the boundary on the basis of a distance between the two pixels. This makes it possible to accurately perform the out-of-focus blurring evaluation even if a contour of a subject is blurred.

Preferably, the evaluating method further includes extracting the edge pixels by applying a Sobel filter. This makes it possible to extract an edge pixel while suppressing an influence of noise.

Preferably, the evaluating method further includes: calculating gradients of respective pixels on the basis of the image information; and extracting a pixel whose magnitude in gradient exceeds a threshold value as the edge pixel. Moreover, preferably, the evaluating method further includes extracting, as the edge pixel, a pixel that is located in the boundary of the image expressed by the image information and that has a larger gradient compared with the gradient of a pixel adjacent thereto in the intersecting direction. This makes it possible to calculate an average edge width WEa without taking into account an edge with relatively low intensity.

Preferably, the evaluating method further includes: dividing the image information into a plurality of areas; selecting a specific area from the areas divided; and performing the out-of-focus blurring evaluation on the specific area selected. Accordingly, since the out-of-focus blurring evaluation is performed in a part in focus, accuracy of the evaluation is improved.

Preferably, the evaluating method further includes performing out-of-focus blurring correction on the image information on the basis of a result of the out-of-focus blurring evaluation. Moreover, preferably, the evaluating method further includes displaying the image information that has been subjected to the out-of-focus blurring correction at no magnification. This makes it possible to appropriately display image information that has been corrected.

Further, provided is a storage medium having an image-information evaluating program stored therein, the evaluating program including:

a code for causing an arithmetic processing unit to extract, from image information to be evaluated, a plurality of edge pixels located in a boundary of an image expressed by the image information;

a code for causing the arithmetic processing unit to calculate, for each of the edge pixels, a number of pixels that include the edge pixel targeted for calculation, that exist in the boundary, and that are arranged in a direction intersecting with the boundary; and a code for causing the arithmetic processing unit to perform out-of-focus blurring evaluation of the image information on the basis of the number of pixels that exist in the boundary and a number of the edge pixels.

According to the storage medium having such an evaluating program stored therein, it is possible to make the arithmetic processing unit accurately perform the out-of-focus blurring evaluation.

An image-information evaluating apparatus includes:

a memory for storing image information; and an arithmetic processing unit, the arithmetic processing unit extracting, from image information to be evaluated, a plurality of edge pixels located in a boundary of an image expressed by the image information, calculating, for each of the edge pixels, a number of pixels that include the edge pixel targeted for calculation, that exist in the boundary, and that are arranged in a direction intersecting with the boundary, and performing out-of-focus blurring evaluation of the image information on the basis of the number of pixels that exist in the boundary and a number of the edge pixels.

According to such an image-information evaluating apparatus, it is possible to accurately perform the out-of-focus blurring evaluation.

In such an image-information evaluating apparatus, it is desirable that the image-information evaluating apparatus is a printing apparatus.

A method of evaluating image information, includes:

extracting, from image information to be evaluated, an edge pixel located in a boundary of an image expressed by the image information;

extracting two pixels sandwiching the edge pixel in a direction intersecting with the boundary, a difference in luminance between each of the two pixels and a pixel adjacent thereto being the largest; and performing out-of-focus blurring evaluation of the image information on the basis of a distance between the two pixels.

According to such an evaluating method, it is possible to accurately perform the out-of-focus blurring evaluation even if a contour of a subject is blurred from the beginning.

Further, provided is a storage medium having an image-information evaluating program stored therein, the evaluating program including:

a code for causing an arithmetic processing unit to extract, from image information to be evaluated, an edge pixel located in a boundary of an image expressed by the image information;

a code for causing the arithmetic processing unit to extract two pixels sandwiching the edge pixel in a direction intersecting with the boundary, a difference in luminance between each of the two pixels and a pixel adjacent thereto being the largest; and a code for causing the arithmetic processing unit to perform out-of-focus blurring evaluation of the image information on the basis of a distance between the two pixels.

According to a storage medium having such an evaluating program stored therein, it is possible to make the arithmetic processing unit accurately perform the out-of-focus blurring evaluation even if a contour of a subject is blurred from the beginning.

An image-information evaluating apparatus includes:

a memory for storing image information; and an arithmetic processing unit, the arithmetic processing unit extracting, from image information to be evaluated, an edge pixel located in a boundary of an image expressed by the image information, extracting two pixels sandwiching the edge pixel in a direction intersecting with the boundary, a difference in luminance between each of the two pixels and a pixel adjacent thereto being the largest, and performing out-of-focus blurring evaluation of the image information on the basis of a distance between the two pixels.

According to such an image-information evaluating apparatus, it is possible to accurately perform the out-of-focus blurring evaluation even if a contour of a subject is blurred from the beginning.

In such an image-information evaluating apparatus, it is desirable that the image-information evaluating apparatus is a printing apparatus.

Object of Explanation

<Concerning Apparatuses to which the Image Evaluating Method is Applied>

In the image evaluating method in this embodiment, image information to be evaluated is acquired and evaluation of the image information acquired is performed to obtain evaluation results. It is possible to apply this image evaluating method to various apparatuses.

For example, it is possible to apply this method to a personal computer in which a computer program for image evaluation (e.g., image processing software) is installed. It is also possible to apply this method to various apparatuses that handle image information. Examples of apparatuses that handle image information include a digital camera, a digital video camera, and a printer.

Thus, in this specification, first, a printer that performs image evaluation will be explained. This printer can evaluate image information to be printed stored in a memory card, display evaluation results corresponding to the image information for a user, and store image information selected by the user in a CD-R (recordable compact disc) or the like.

Printer

<Concerning a Constitution of the Printer 1>

Figure 2:
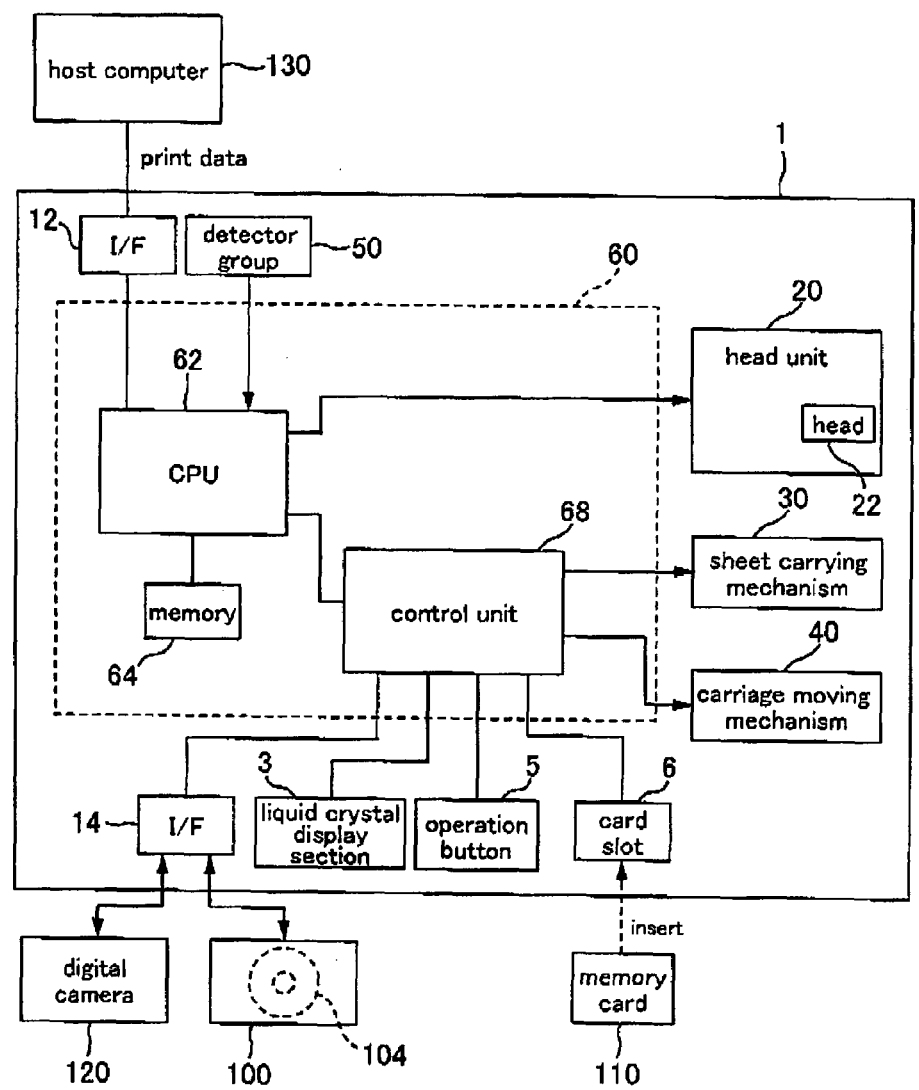
FIG. 2 is a block diagram for explaining an electric constitution of the printer 1.

First, a constitution of a printer 1 will be explained. FIG. 1 is a diagram illustrating external appearances of the printer 1 and a CD-R device 100 connected to this printer 1. FIG. 2 is a block diagram for explaining an electric constitution of the printer 1.

As shown in FIG. 1, an operation panel 2, a liquid crystal display section 3, and a paper discharging section 4 are provided in a front face portion of the printer 1. Various operation buttons 5 and card slots 6 are provided in the operation panel 2. The operation buttons 5 are operated when an instruction is given to the printer 1. The card slots 6 are sections in which a memory card 110 (a card-type flash memory, see FIG. 2) is inserted. For example, image information of images photographed by a digital camera 120 is stored in this memory card 110. Since there are several types of memory cards 110, a plurality of these card slots 6 are provided to make it possible to insert the respective memory cards 110 in the card slots 6. The liquid crystal display section 3 displays various kinds of information. The liquid crystal display section 3 is a section on which a menu is displayed and the images of the image information stored in the memory card 110 are displayed. In this embodiment, the liquid crystal display section 3 is arranged above the operation buttons 5.

An open-closable paper discharge tray is provided in the paper discharging section 4. The paper discharge tray is attached such that an upper portion thereof can be brought down forward. This paper discharge tray functions as a support on which a printed sheet is placed at the time of printing. On the other hand, a paper supplying section 7 and various connectors (not shown) are provided in a rear face portion of the printer 1. The paper supplying section 7 is a section capable of holding sheets for printing in a stacked manner. The connectors are sections for connecting the printer 1 to external devices such as a CD-R device 100 and the digital camera 120. The connectors are, for example, USB terminals.

In the example shown in FIG. 1, the CD-R device 100 is connected to the printer 1 via a cable 102. Connection to the printer 1 is not limited to the cable 102 and may be wireless. The CD-R device 100 is used when the image information stored in the memory card 110 is backed up in the CD-R 104. It is also possible to print the image information stored in a CD (compact disc; not shown) and/or a CD-R 104 by connecting the CD-R device 100 to the printer 1.

An electric constitution of the printer 1 will be explained. As shown in FIG. 2, the printer 1 includes a head unit 20, a sheet carrying mechanism 30, a carriage moving mechanism 40, a detector group 50, a printer-side controller 60, the liquid crystal display section 3, the operation buttons 5, and the card slots 6. Besides, the printer 1 includes a first interface 12 for connecting the printer 1 to a host computer 130 and a second interface 14 for connecting the printer 1 to the digital camera 120 and the CD-R device 100.

The head unit 20 is a unit for ejecting ink to a sheet and has a head 22 for ejecting the ink. The head unit 20 is attached to a carriage (not shown) and moved together with the carriage by the carriage moving mechanism 40 that moves the carriage in a carriage movement direction. The sheet carrying mechanism 30 carries a sheet in a direction intersecting with the carriage movement direction. The detector group 50 is for detecting a state of the printer 1. The detector group 50 includes, for example, a linear encoder for detecting a position of the carriage, a rotary encoder for detecting a carried amount of paper, and a paper detector for detecting presence or absence of a sheet (all of which are not shown).

The printer-side controller 60 is a controller that performs control of the printer 1. The printer-side controller 60 includes a CPU 62, a memory 64, and a control unit 68. The CPU 62 is an arithmetic processing unit for performing overall control of the printer 1. The memory 64 is for securing an area for storing a program for the CPU 62, a work area, and the like and constituted by a storage element such as a RAM, an EEPROM, or a ROM. Image information to be evaluated is stored in the memory 64 at the time of evaluation of the image information. The control unit 68 is arranged between respective sections to be controlled and the CPU 62. The control unit 68 generates a drive signal for a motor on the basis of a command from the CPU 62 and changes signals sent from the respective sections into a form interpretable by the CPU 62 to output the signals.

Usually, when the printer 1 receives print data from a host computer 130, the printer 1 performs print processing on the basis of the print data. More specifically, after the reception of the print data, the printer-side controller 60 causes the sheet carrying mechanism 30 to carry a sheet to a print start position, causes the carriage moving mechanism to move the carriage in the carriage movement direction, and ejects the ink from the head moving with the carriage on the basis of the print data. When these operations are repeated, an image is printed on the sheet.

Moreover, the printer 1 in this embodiment performs backup processing for image information. In the backup processing, the printer-side controller 60 causes the CD-R device 100 to store the image information in the CD-R from the memory card 110 inserted in the card slot 6. This backup processing is started when a user operates the operation button 5. In this embodiment, evaluation of image information is also performed in this backup processing. The backup processing and the evaluation processing for image information will be hereinafter explained.

Evaluation and Backup of Image Information

<Concerning an Outline of the Backup Processing>

Figure 3:
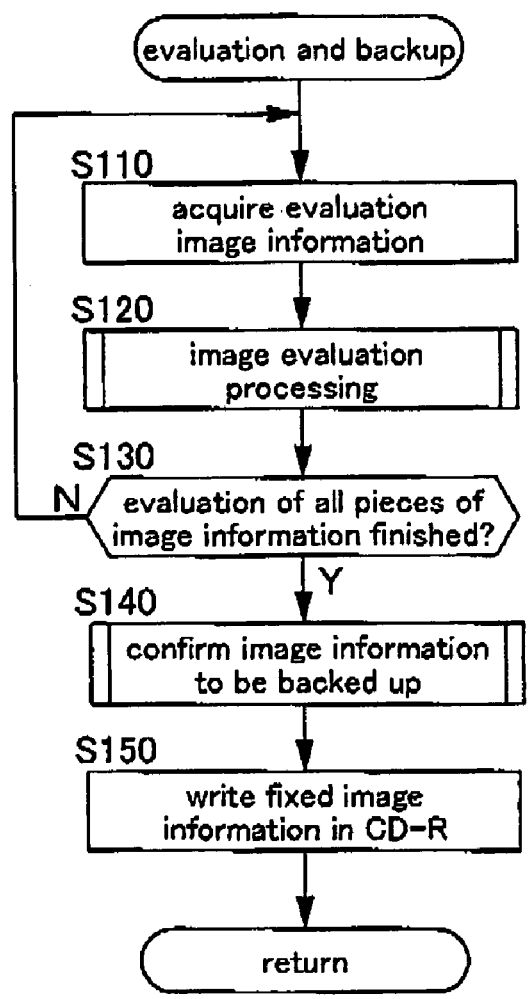
FIG. 3 is a flowchart explaining backup processing.

FIG. 3 is a flowchart explaining the backup processing. This processing is executed by the CPU 62 on the basis of a program stored in the memory 64 of the printer 1. Therefore, the program has codes for causing the CPU 62 to execute the processing.

In this processing, first, the CPU 62 performs acquisition of evaluation image information (S110). The evaluation image information means image information to be evaluated. In this processing, the CPU 62 designates one piece of evaluation image information from the image information to be backed up, which is stored in the memory card 110, and stores this evaluation image information in the memory 64. Therefore, when there are plural pieces of image information to be backed up, the CPU 62 acquires one of the plural pieces of image information as the evaluation image information. When there is one piece of image information to be backed up, the CPU 62 acquires the image information as the evaluation image information.

Subsequently, the CPU 62 performs the image evaluation processing (S120). In this image evaluation processing, the CPU 62 applies the out-of-focus blurring evaluation to the evaluation image information. This image evaluation processing will be explained later.

Subsequently, the CPU 62 judges whether or not all the pieces of image information have been evaluated (S130). When there is unevaluated image information, the CPU 62 returns to step S110 and performs the processing described above. On the other hand, when evaluation of all the pieces of image information ends, the CPU 62 performs processing for confirming the image information to be backed up (S140). In this processing, the CPU 62 asks the user to confirm, on the basis of evaluation results in the image evaluation processing (S120), whether or not image information not meeting a criterion is to be backed up. In this case, a screen for facilitating the user's confirmation is displayed on the liquid crystal display section 3 and the image information to be backed up is decided according to an input from the operation button. When the image information to be backed up is decided, the CPU 62 writes the decided image information in the CD-R 104 (S150). In this writing processing, the CPU 62 stores in the CD-R 104 the evaluation results (contents of evaluation) obtained in step S120 together with the image information to be evaluated. For example, the evaluation results are stored as additional information in an Exif (exchangeable image file format).

Image Evaluation Processing

Figure 4:
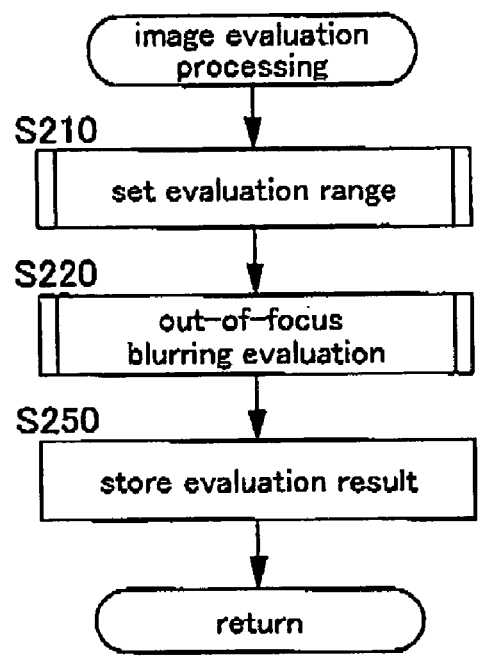
FIG. 4 is a flowchart for explaining image evaluation processing.

FIG. 4 is a flowchart for explaining the image evaluation processing. In this image evaluation processing, processing for setting of an evaluation range (S210), the out-of-focus blurring evaluation (S220), and storage of evaluation results (S250) is performed.

The respective kinds of processing will be hereinafter explained. Note that a horizontal direction in an image is set as an X direction and a vertical direction in the image is set as a Y direction. Each pixel P (see FIG. 6B, etc.) forming the image information is expressed as P(i,j) using a position i in the horizontal direction and a position j in the vertical direction in the image information.

Setting of an Evaluation Range (S210)

Figure 5:
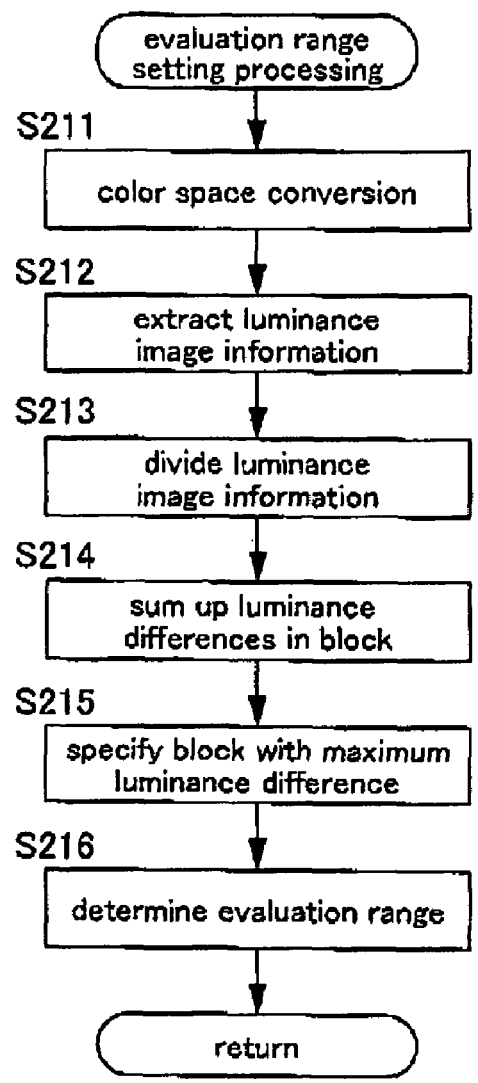
FIG. 5 is a flowchart for explaining setting for an evaluation range (S210)

FIG. 5 is a flowchart for explaining the setting of an evaluation range (S210). The processing is executed by the CPU 62 on the basis of a program stored in the memory 64 of the printer 1. Therefore, the program has codes for causing the CPU 62 to execute these kinds of processing.

Figure 6A:
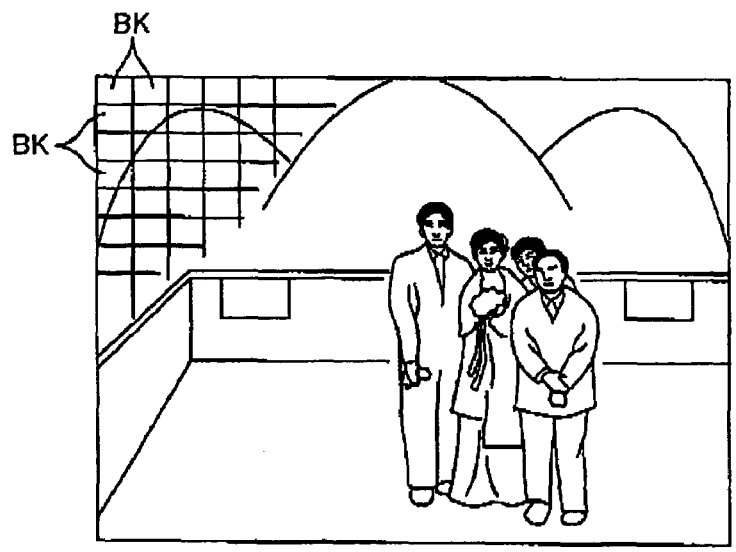
FIG. 6A is a conceptual diagram for explaining image information divided into 256 blocks BK.
Figure 6B:
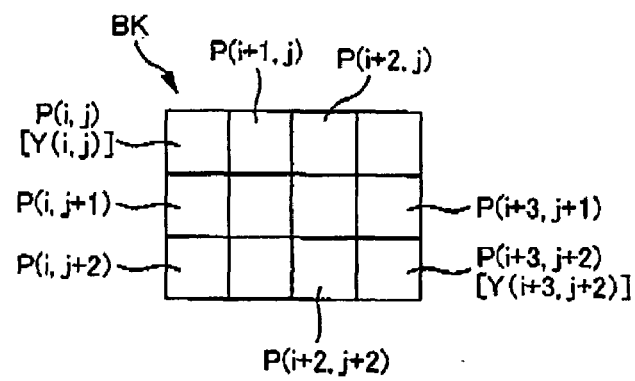
FIG. 6B is a conceptual diagram for explaining a luminance difference between adjacent pixels.
Figure 6C:
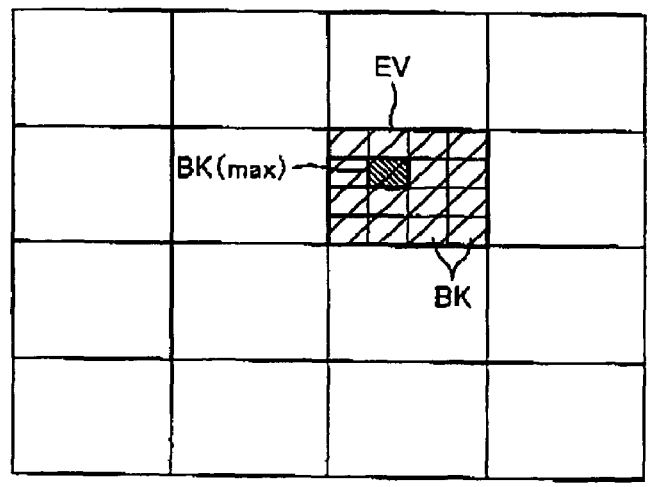
FIG. 6C is a conceptual diagram showing an evaluation range EV including a block BK having a largest number of edges.

FIG. 6A is a conceptual diagram for explaining image information divided into 256 blocks BK. FIG. 6B is a conceptual diagram for explaining a luminance difference between adjacent pixels. FIG. 6C is a conceptual diagram showing an evaluation range EV including a block BK having a largest number of edges. In setting an evaluation range, the evaluation range EV is specified from the image information. The evaluation range EV is a range in which the out-of-focus blurring evaluation (S220) is performed.

First, the CPU 62 converts the color space of the evaluation image information (S211). For example, the CPU 62 converts the evaluation image information represented by an RGB color space into image information of a YIQ color space (a color space of Y (luminance), I (orange-cyan), and Q (green-magenta)). When image information photographed by a digital camera is in JPEG format rather than bitmap information of the RGB color space, the color space of the evaluation image information maybe converted into a YUV color space. In short, the color space of the evaluation image information only has to be converted into a color space including a component of luminance (Y).

Subsequently, the CPU 62 extracts luminance image information (S212). The image information of the YIQ color space generated by the conversion processing in S211 has image information of a Y plane, image information of an I plane, and image information of a Q plane. Among these pieces of image information, the image information of the Y plane is extracted as luminance image information.

Subsequently, the CPU 62 divides the luminance image information (S213). In this embodiment, as shown in FIG. 6A, the luminance image information is divided by 16×16 into 256 blocks BK. For example, when the luminance image information is formed of 640×480 pixels, each of the blocks BK is formed of 40×30 pixels.

Subsequently, the CPU 62 calculates a luminance difference between each pixel in the luminance image information and a pixel adjacent to that pixel and calculates a total of luminance differences for each of the blocks (S214). For convenience of explanation, it is assumed that, as shown in FIG. 6B, each of the blocks BK is formed of twelve pixels from a pixel P(i,j) at an upper left corner to a pixel P(i+3,j+2) at a lower right corner. In this case, the CPU 62 subtracts a luminance Y (i, j) of the pixel P(i,j) from a luminance Y (i+1,j) of the pixel P(i+1,j) to calculate a luminance difference in the horizontal direction of the pixel P (i,j). Similarly, the CPU 62 subtracts the luminance (i+1,j) of the pixel P(i+1,j) from a luminance Y (i+2,j) of a pixel P(i+2,j) to calculate a luminance difference in the horizontal direction of the pixel P(i+1,j). The CPU 62 applies such calculation to all the pixels in the block BK. Then, the CPU 62 totals absolute values of the luminance differences to calculate a total of luminance differences in the horizontal direction in the block BK. Similarly, the CPU 62 also calculates a total of luminance differences in the vertical direction in each of the blocks BK. Then, the CPU 62 adds the total of luminance differences in the horizontal direction and the total of luminance differences in the vertical direction for each of the blocks to calculate a sum of luminance differences for each of the blocks.

Subsequently, the CPU 62 compares the sums of luminance differences obtained in the respective blocks BK and specifies a block BK having a largest sum of luminance differences (S215). It is considered that, as for pixels belonging to the block BK having the largest sum of luminance differences, the luminance difference is large between each pixel and a pixel adjacent thereto. In other words, it is considered that the block BK has the largest number of edges. For example, in the image information in FIG. 6A, it is considered that the luminance difference is the largest in the part of a human face. Therefore, the block BK corresponding to the part of the human face is specified as a block BK (max) having a largest sum of luminance differences.

Subsequently, the CPU 62 sets an evaluation range EV on the basis of the block BK (max) specified (S216). This evaluation range EV is set such that the block BK (max) having the largest sum of luminance differences is arranged in the center thereof. The size of the evaluation range EV is set to a size obtained by reducing the size corresponding to the image information at a predetermined ratio. For example, when the evaluation range EV is to be set at a ratio of 0.25 (i.e., to a size obtained by equally dividing a size corresponding to the image information into sixteen) with respect to the image information of 640×480 pixels, as shown in FIG. 6C, the evaluation range EV will become a range of 160×120 pixels (equivalent to 4×4 blocks).

The evaluation range set in this way has characteristics described below. Usually, in the case of image information photographed by a digital camera, a contour is clear in a part in focus. When the contour of the image is clear, the luminance difference between adjacent pixels in that part of the image information is large. Since the evaluation range is a range including the block BK having the maximum luminance difference, the evaluation range EV set by the processing described above is considered to be a part in focus in the image information.

The CPU 62 performs the out-of-focus blurring evaluation explained below in this evaluation range.

Out-of-focus Blurring Evaluation (S220)

Out-of-focus blurring is a state in which an image is out of focus. When photographing is performed in the out-of-focus state, an image of a subject is not focused on a film (in the case of a digital camera, on a CCD sensor). In other words, when photographing is performed in the out-of-focus state, information on a certain point of the subject will be recorded in such a state that the point is among a plurality of pixels within a concentric circle. As a result, an image photographed is blurred. In particular, a contour of the subject is blurred.

In the out-of-focus blurring evaluation in this embodiment, a contour of a subject or a contour of a pattern is extracted as an edge, a width of the edge (an edge width WE) is calculated, and when the edge width WE is large, it is evaluated that the image is blurred due to being out of focus. In this embodiment, the number of edges extracted Ne is counted, edge widths WE that have been calculated are totaled to calculate a total edge width WEt (=ΣWE), an average edge width WEa (=WEt/Ne) is calculated, and the out-of-focus blurring evaluation is performed on the basis of this average edge width WEa. Two kinds of out-of-focus blurring evaluating methods will be hereinafter explained.

<First Out-of-focus Blurring Evaluating Method>

Figure 7:
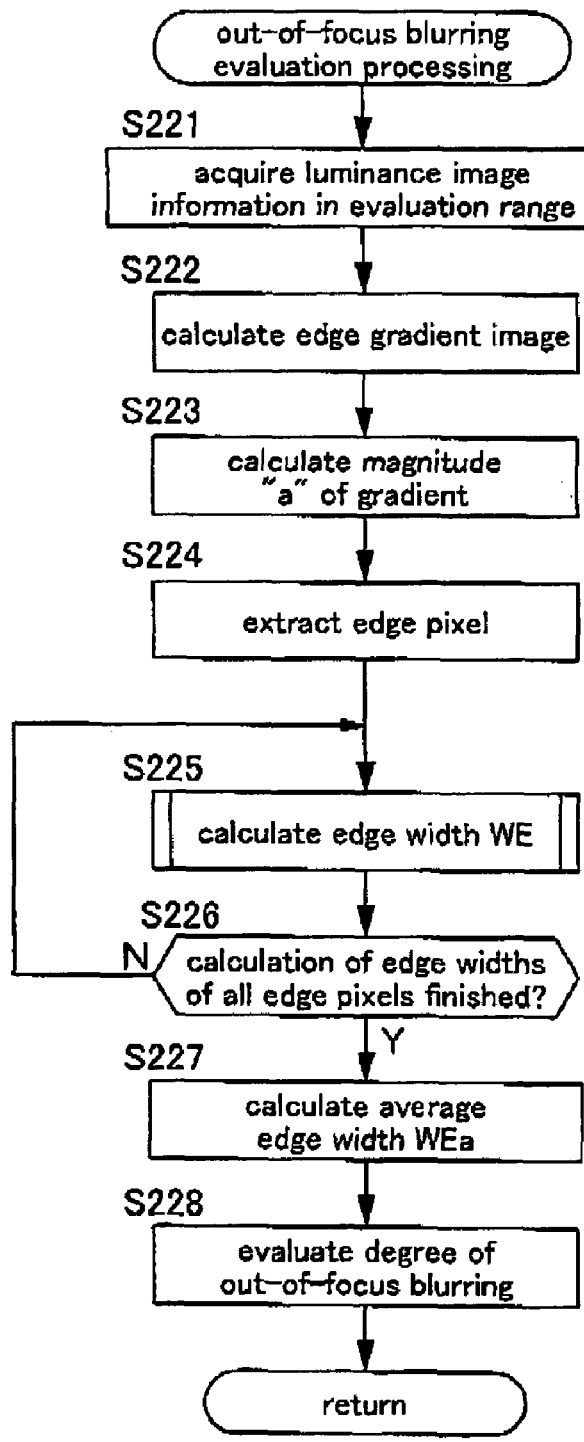
FIG. 7 is a flowchart for explaining a first out-of-focus blurring evaluating method.

FIG. 7 is a flowchart for explaining a first out-of-focus blurring evaluating method. Respective kinds of processing are executed by the CPU 62 on the basis of a program stored in the memory 64 of the printer 1. Therefore, the program has codes for causing the CPU 62 to execute these kinds of processing.

First, the CPU 62 acquires luminance image information of the evaluation range EV set in S210. The CPU 62 may extract luminance image information of the evaluation range EV from the luminance image information of the entire range. Alternatively, the CPU 62 may extract image information of the evaluation range EV from evaluation image information of an RGB color space and subject the image information extracted to color conversion to acquire luminance image information.

Subsequently, the CPU 62 applies a Sobel filter in an X direction to calculate an edge gradient image Gx indicating a gradient (a degree of inclination) of a luminance in the X direction, and applies a Sobel filter in a Y direction to calculate an edge gradient image Gy indicating a gradient of a luminance in the Y direction (S222). In other words, the CPU 62 applies the Sobel filter in the X direction to extract edges in the X direction of the luminance image information and applies the Sobel filter in the Y direction to extract edges in the Y direction of the luminance image information. Each pixel forming the edge gradient image Gx is expressed as Gx(i,j) and a pixel forming the edge gradient image Gy is expressed as Gy(i,j). Gx(i,j) indicates an edge gradient in the X direction in a position (i,j) of the luminance image information and Gy(i,j) indicates an edge gradient in the Y direction in the position (i,j) of the luminance image information.

Figure 9:
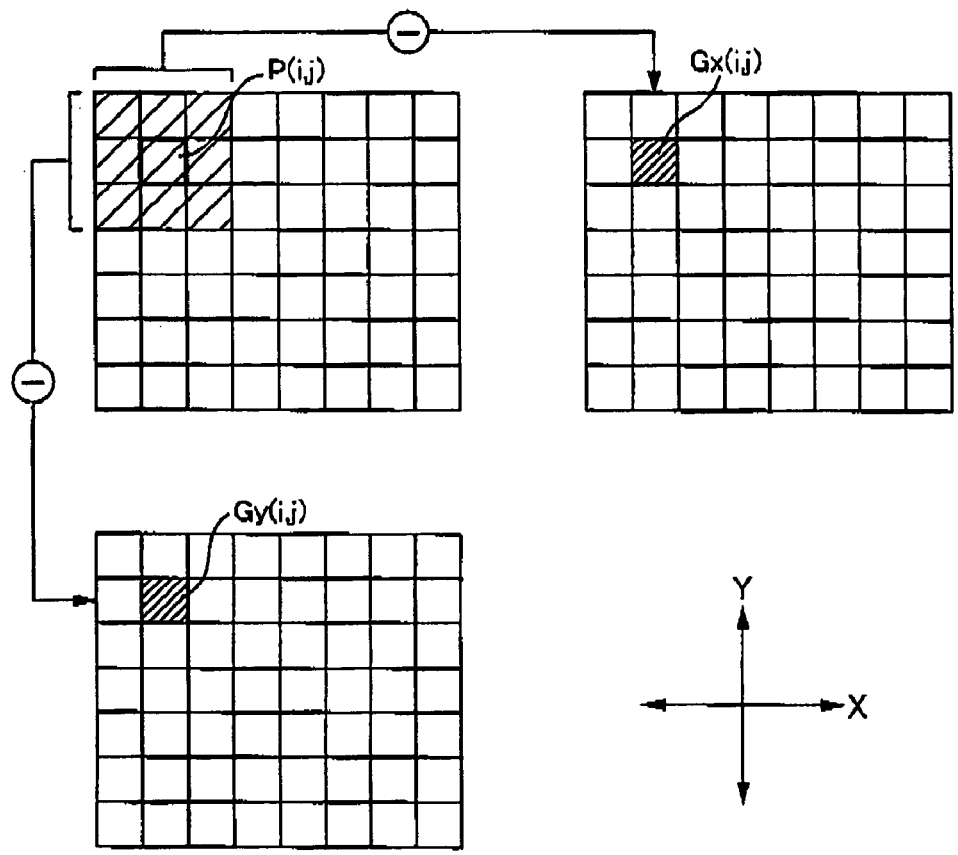
FIG. 9 is a diagram schematically illustrating application of a Sobel filter.
Figure 10:
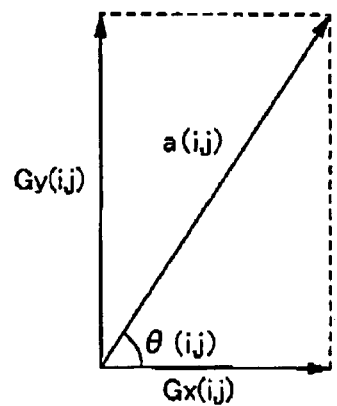
FIG. 10 is a diagram schematically illustrating a magnitude "a" of a gradient and an edge direction $\theta$.

The application of the Sobel filter will be explained. FIG. 8A is a diagram illustrating the Sobel filter in the X direction used for generation of an edge image. FIG. 8B is a diagram illustrating the Sobel filter in the Y direction used for generation of an edge image. FIG. 8C is a schematic diagram for illustrating a range of 3×3 pixels around a certain pixel P(i,j) and luminances Y of pixels P in this range. FIG. 9 is a diagram schematically illustrating the application of the Sobel filter. FIG. 10 is a diagram schematically illustrating a magnitude "a" (described later) of a gradient and an edge direction θ (described later).

The Sobel filter is a filter including nine elements (3×3). Applying the Sobel filter to the pixel P(i,j) shown in FIG. 8C means calculating products of the elements corresponding to the Sobel filter and the respective luminances Y (i−1,j−1) to Y(i+1,j+1) of the 3×3 pixels present near the pixel P(i,j) and calculating a sum of the nine products obtained. For example, when the Sobel filter in the X direction is applied to the pixel P(i,j), Gx(i,j) is calculated as described below.

$$Gx(i, j) = [Y(i+1, j-1) + 2 \times Y(i+1, j) + Y(i+1, j+1)] - [Y(i-1, j-1) + 2 \times Y(i-1, j) + Y(i-1, j+1)]$$

Expression 1

When the Sobel filter in the X direction and the Sobel filter in the Y direction are applied to the luminance image information Y(i,j), respectively, as indicated by hatching in FIG. 9, the edge gradient Gx(i,j) in the X direction and the edge gradient Gy(i,j) in the Y direction are calculated on the basis of the 3×3 pixels around the pixel P(i,j).

Subsequently, the CPU 62 calculates a magnitude a(i,j) of a gradient of each pixel in the evaluation range EV (S223). The magnitude a(i,j) of a gradient is equivalent to a degree indicating that a pixel is at an edge. The magnitude a (i,j) of a gradient is calculated as represented by the following Expression. In other words, as shown in FIG. 10, the magnitude a(i,j) of a gradient is calculated as a magnitude of a sum of a vector of the edge gradient Gx(i,j) in the horizontal direction and a vector of the edge gradient Gy(i,j) in the vertical direction.

$$a(i,j) = \sqrt{Gx^2(i,j) + Gy^2(i,j)}$$ Expression 2

Subsequently, the CPU 62 extracts an edge pixel to be processed (S224). In the first out-of-focus blurring evaluating method, if the magnitude a (i,j) in gradient of a pixel is larger than a threshold value, then that pixel is extracted as an edge pixel. The CPU 62 extracts all pixels having magnitudes (a) of gradients larger than the threshold value from the evaluation range EV.

Figure 11:
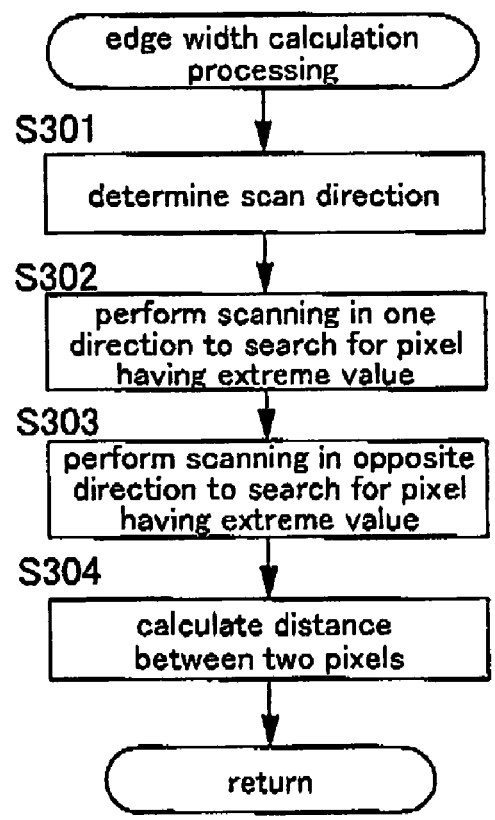
FIG. 11 is a flowchart of a method of calculating an edge width WE in the first out-of-focus blurring evaluating method.

Subsequently, the CPU 62 calculates the edge width WE of each edge pixel (S226). FIG. 11 is a flowchart of a method of calculating the edge width WE in the first out-of-focus blurring evaluating method.

First, the CPU 62 determines a scan direction on the basis of the edge direction θ (S301). An edge direction θ(i,j) is a direction that is set according to a ratio of the edge gradient Gx(i,j) in the horizontal direction and the edge gradient Gy(i,j) in the vertical direction. In other words, as shown in FIG. 10, the edge direction θ(i,j) is a direction of a sum of the vector of the edge gradient Gx(i,j) in the horizontal direction and the vector of the edge gradient Gy(i,j) in the vertical direction. The scan direction is the horizontal direction or the vertical direction. If the edge direction θ is close to the horizontal direction (0 to 45 degrees), the scan direction will be the horizontal direction. Conversely, if the edge direction θ is close to the vertical direction (45 to 90 degrees), the scan direction will be the vertical direction. In this embodiment, in determining the scan direction (S301), the CPU 62 compares magnitudes of Gx(i,j) and Gy(i,j). If Gx(i,j) is larger, the CPU 62 sets the scan direction in the horizontal direction, and if Gy(i,j) is larger, the CPU 62 sets the scan direction in the vertical direction (that is, in this embodiment, the CPU 62 does not directly calculate the scan direction θ). In the following explanation, it is assumed that the scan direction is the vertical direction (the Y direction).

Subsequently, the CPU 62 searches for a pixel having an extreme value of luminance out of pixels located in a −Y direction with respect to the edge pixel. Specifically, first, the CPU 62 compares a luminance of the edge pixel and a luminances of a pixel adjacent to the edge pixel in the −Y direction. If the luminance of the edge pixel is larger than the luminance of the pixel adjacent to the edge pixel in the −Y direction, the CPU 62 specifies a pixel having a minimum value of luminance out of the pixels located in the −Y direction with respect to the edge pixel. On the other hand, if the luminance of the edge pixel is smaller than the luminance of the pixel adjacent to the edge pixel in the −Y direction, the CPU 62 specifies a pixel having a maximum value of luminance out of the pixels located in the −Y direction with respect to the edge pixel. This makes it possible to extract, from among the pixels located in the −Y direction with respect to the edge pixel, a pixel closest to the edge pixel and having an extreme value.

Subsequently, the CPU 62 searches for a pixel having an extreme value of a luminance out of the pixels located in the Y direction with respect to the edge pixel (S303). If the pixel having the minimum value is specified in the search in the −Y direction, the CPU 62 specifies a pixel having a maximum value in the search in the Y direction. On the other hand, if the pixel having the maximum value is specified in the search in the −Y direction, the CPU 62 specifies a minimum value in the search in the Y direction.

Two pixels are extracted according to the processing in S302 and S303. The two pixels are located to sandwich the edge pixel from the vertical direction. Similarly, when the scan direction is the horizontal direction, the two pixels specified according to the processing in S302 and S303 are located to sandwich the edge pixel from the horizontal direction.

Subsequently, the CPU 62 calculates a distance between the two pixels specified according to the processing in S302 and S303 (S304). This distance is the edge width WE. In other words, the edge width WE in this case means a distance between the two pixels having the maximum value and the minimum value of luminance near the edge pixel. The distance between the two pixels is indicated by the number of pixels. For example, in the case of a pixel P(i,i−4) to a pixel P(i,i+3), a distance between two pixels is seven pixels.

Figure 12A:
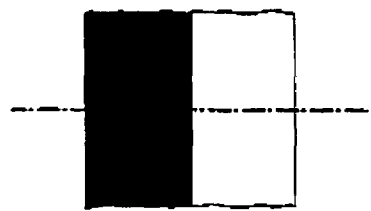
FIG. 12A is a diagram for explaining an image with a sharp edge.
Figure 12C:
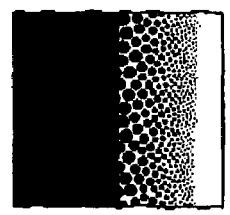
FIG. 12C is a diagram for explaining an image with a blurred edge.
Figure 12B:
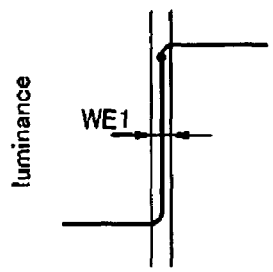
FIG. 12B is a diagram for explaining an edge width with respect to the edge in FIG. 12A.
Figure 12D:
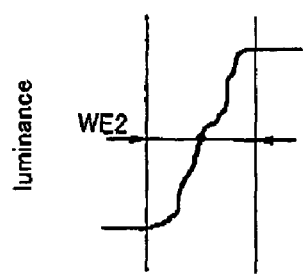
FIG. 12D is a diagram for explaining an edge width with respect to the edge in FIG. 12C.

FIG. 12A is a diagram for explaining an image having a sharp edge. FIG. 12B is a diagram for explaining an edge width with respect to the edge in FIG. 12A. FIG. 12C is a diagram for explaining an image with a blurred edge. FIG. 12D is a diagram for explaining an edge width with respect to the edge in FIG. 12C.

In the image having the sharp edge in FIG. 12A, as shown in FIG. 12B, an edge width WE1 is calculated as a small value. On the other hand, in the image with the blurred edge, as shown in FIG. 12D, an edge width WE2 is calculated as a large value. In this way, it is possible to determine whether an image is blurred on the basis of a size of the edge width WE.

Thus, the CPU 62 calculates the edge width WE with respect to all the edge pixels (S226). The CPU 62 then calculates an average edge width WEa (S227). In order to calculate the average edge width WEa, the CPU 62 counts the number of edge pixels Ne extracted, totals the edge widths WE calculated for the respective edge pixels to calculate a total edge width WEt (=ΣWE), and divides the total edge width WEt by the number of edge pixels Ne.

The CPU 62 evaluates out-of-focus blurring on the basis of the average edge width WEa (S228). If the average edge width WEa is small, then it is considered that an edge of a contour of an image is in a sharp state, and thus, it is evaluated that the image is not blurred. On the other hand, if the average edge width WEa is large, then it is considered that an edge of a contour of an image is in a blurred state, and thus, it is evaluated that the image is blurred.

<Second Out-of-focus Blurring Evaluating Method>

Compared with the first out-of-focus blurring evaluating method, the processing for calculating the edge width WE (S225, and S301 to S304 in FIG. 11) is different in the present second out-of-focus blurring evaluating method and the other processes are the same. Thus, the processing for calculating the edge width in the second out-of-focus blurring evaluating method will be hereinafter explained.

Figure 13:
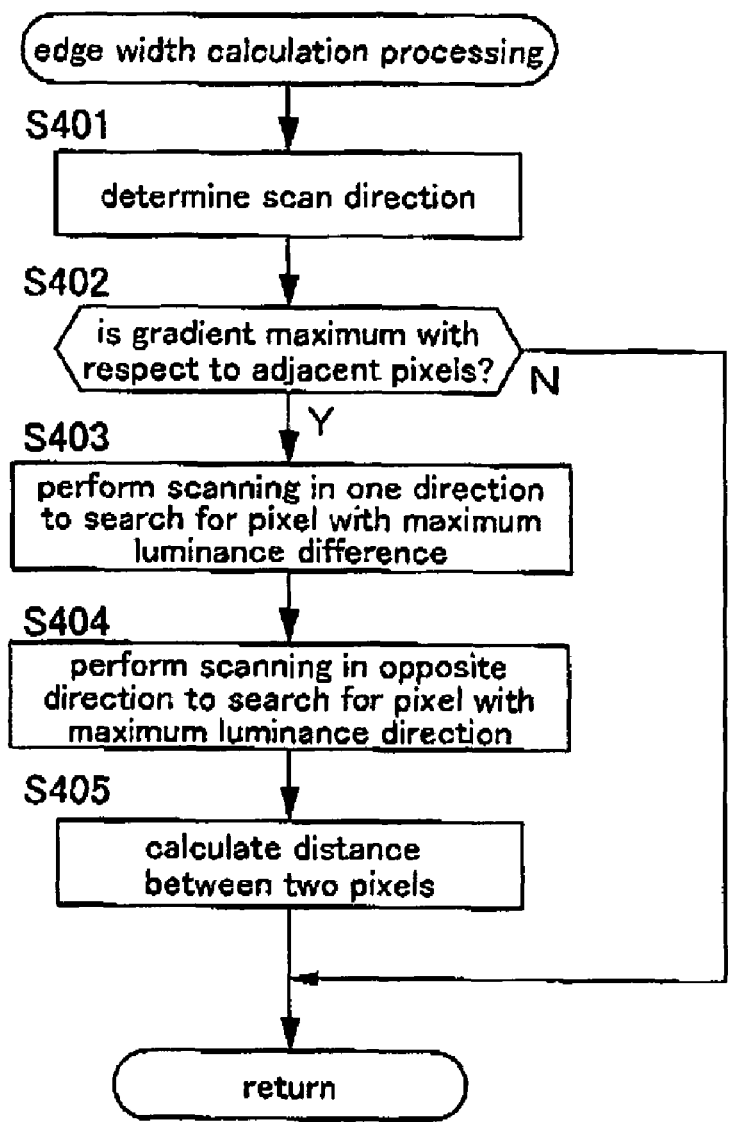
FIG. 13 is a flowchart of a method of calculating an edge width WE in a second out-of-focus blurring evaluating method.

FIG. 13 is a flowchart of a method of calculating the edge width WE in the second out-of-focus blurring evaluating method. Respective kinds of processing are executed by the CPU 62 on the basis of a program stored in the memory 64 of the printer 1. Therefore, the program has codes for causing the CPU 62 to execute these kinds of processing.

The CPU 62 determines a scan direction (S401). This processing is the same as that in S301 in the first out-of-focus blurring evaluating method. In the following explanation, it is assumed that the scan direction is the horizontal direction (the X direction).

Subsequently, the CPU 62 judges whether the magnitude "a" of the edge pixel is larger than the magnitudes "a" of gradients of adjacent pixels. An "adjacent pixel" refers to a pixel adjacent to the edge pixel in the scan direction. When the edge pixel is in the position (i,j), positions of the adjacent pixels are a position (i−1,j) and a position (i+1,j). In other words, in this processing, it is judged whether the magnitude a(i,j) of the gradient of the edge pixel is larger than the magnitudes a(i−1,j) and a(i+1,j) of the gradients of the adjacent pixels. When the magnitude a(i,j) is smaller than the magnitudes a(i−1,j) and a(i+1,j), the CPU 62 does not calculate the edge width WE and does not include that edge pixel in the number of edge pixels at the time when the average edge width WEa is calculated. In other words, when the magnitude "a" of a gradient of an edge pixel is smaller than those of the adjacent pixels, the pixel is not treated as an edge pixel. On the other hand, when the magnitude "a" of a gradient of an edge pixel is larger than those of the adjacent pixels, as explained below, the CPU 62 calculates the edge width WE.

Figure 14:
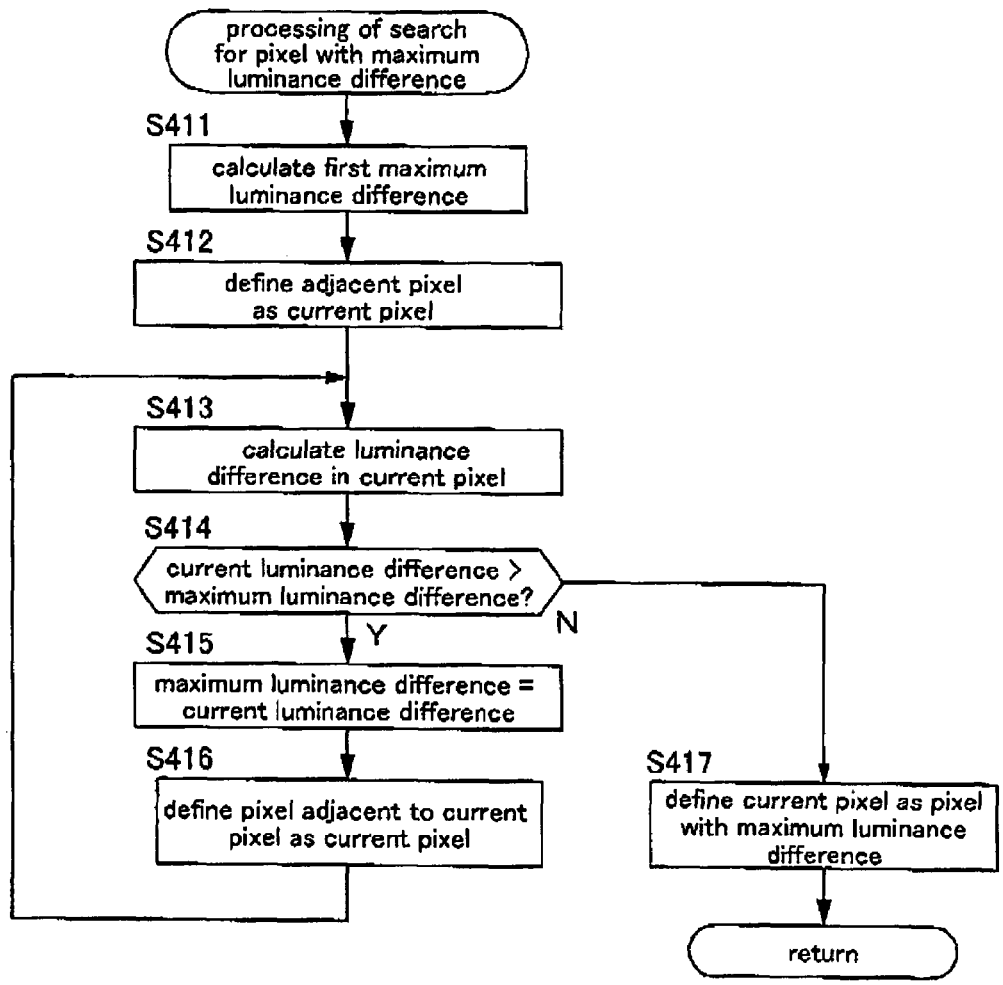
FIG. 14 is a flowchart of search processing for a pixel having a maximum luminance difference.

Subsequently, the CPU 62 searches, from among the pixels located in the −X direction with respect to the edge pixel, for a pixel (a pixel having a maximum luminance difference) for which the difference in luminance between that pixel and a pixel adjacent thereto becomes the largest (S403). FIG. 14 is a flowchart of search processing for a pixel having a maximum luminance difference.

First, the CPU 62 calculates a luminance difference between the luminance Y(i,j) of the edge pixel and a luminance Y(i−1,j) of a pixel adjacent to the edge pixel in −X direction. This luminance difference is defined as an initial maximum luminance difference. Subsequently, the CPU 62 defines a pixel P(i−1,j) adjacent to the edge pixel in the −X direction as a current pixel (S412). Then, the CPU 62 calculates a luminance difference between a luminance Y(i−1,j) of the current pixel and a luminance Y(i−2,j) of a pixel adjacent to the current pixel in the −X direction as a luminance difference of this current pixel (S413). The CPU 62 compares the current pixel difference and the maximum luminance difference. If the current luminance difference is smaller than the maximum luminance difference, then the CPU 62 defines the current pixel as a pixel having the maximum luminance difference and ends the processing. On the other hand, if the current luminance difference is larger than the maximum luminance difference, then the CPU 62 updates the maximum luminance difference to the current luminance difference (S415), defines a pixel adjacent to the current pixel in the −X direction as a new current pixel (S416), and repeats the processing in S413 and S414. This makes it possible to search for a pixel having a maximum luminance difference located in the −X direction with respect to the edge pixel.

Subsequently, the CPU 62 searches, from among the pixels located in the X direction with respect to the edge pixel, for a pixel for which the difference in luminance between that pixel and a pixel adjacent thereto becomes the largest (S404). Processing in this case is substantially the same as the search processing in the −X direction.

Two pixels are extracted according to the processing in S403 and S404. The two pixels are located to sandwich the edge pixel from the horizontal direction. Similarly, when the scan direction is the vertical direction, the two pixels specified according to the processing in S403 and S404 will be located to sandwich the edge pixel from the vertical direction.

Subsequently, the CPU 62 calculates a distance between the two pixels (pixels having a maximum luminance difference) specified by the processing in S403 and S404 (S405). This distance is the edge width WE. In other words, the edge width WE in this case is a distance between the two pixels sandwiching the edge pixel near the edge pixel, wherein the difference in luminance between each of the two pixels and a pixel adjacent thereto is the largest.

Figure 15A:
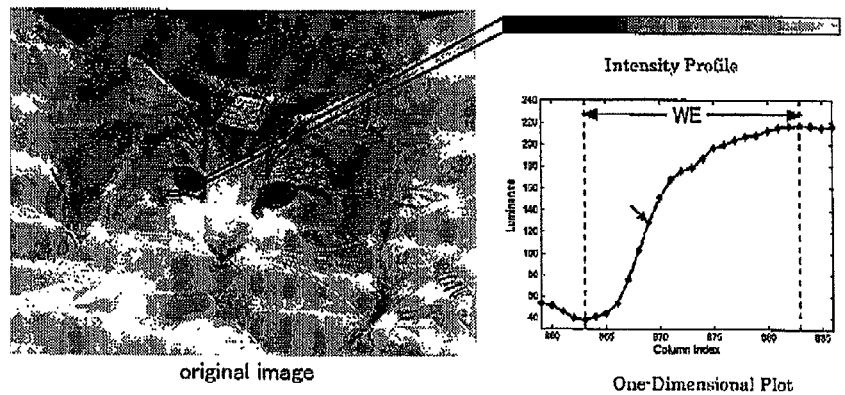
FIG. 15A is a diagram for explaining an edge width in the first out-of-focus blurring evaluating method.
Figure 15B:
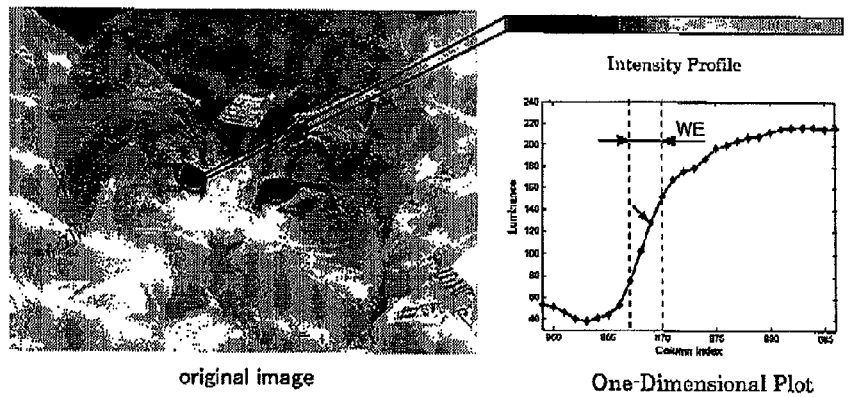
FIG. 15B is a diagram for explaining an edge width in the second out-of-focus blurring evaluating method.

FIG. 15A is a diagram for explaining an edge width in the first out-of-focus blurring evaluating method. FIG. 15B is a diagram for explaining an edge width in the second out-of-focus blurring evaluating method. Evaluation image information indicates an image of a cat. Images of the cat in both the figures are the same image. In the image of the cat, the part of a face of the cat is in focus and the image is not blurred because of out-of-focus blurring. A graph of luminances of pixels around an edge pixel is shown on the right side in each of the figure. A point indicated by an arrow in the graph indicates a luminance of the edge pixel.

In the part of a striped pattern in the face of the cat, since the part changes from a brown area to a white area, an edge pixel may be extracted. However, regardless of the fact that the image is in focus, a change in luminances around the edge pixel is gentle because of an influence of thick hair of the cat. In such an image, since the change in luminances is gentle, a pixel having an extreme value of a luminance near the edge pixel is in a position apart from the edge pixel. As a result, when image information of the cat is evaluated according to the first out-of-focus blurring evaluating method, since the edge width WE has a large value as in the graph on the right side in FIG. 15A, regardless of the fact that the image is in focus, it is misevaluated that the image is an image blurred because of out-of-focus blurring.

On the other hand, according to the second out-of-focus blurring evaluating method, two pixels for which the difference in luminance between them and each pixel adjacent thereto are specified, rather than specifying a pixel having an extreme value of a luminance. As a result, even when the change in luminances around the edge pixel is gentle because of an influence of the thick hair of the cat, if the image is in focus, a pixel close to the edge pixel will be specified as a pixel having a maximum luminance difference. As a result, when the image information of the cat is evaluated according to the second out-of-focus blurring evaluating method, since the edge width WE becomes a width corresponding to focus as shown in the graph on the right side in FIG. 15B, it is possible to judge that the image is not blurred because of out-of-focus blurring.

Further, according to the second out-of-focus blurring evaluating method, even in a case where a certain pixel is extracted as an edge pixel, if the magnitude "a" in gradient of an adjacent pixel is larger than the magnitude "a" in gradient of the edge pixel, an edge width corresponding to that edge pixel will not be calculated (see S402 in FIG. 13). This makes it possible to calculate the average edge width WEa without taking into account an edge having relatively low intensity.

Storage of Evaluation Results

After the out-of-focus blurring evaluation of certain evaluation image information, the CPU 62 performs storage of evaluation results (S250). The evaluation results may be the average edge width WEa or may be presence or absence of out-of-focus blurring. The evaluation results are stored in the memory 64 in association with the evaluation image information.

After evaluation is performed for all the pieces of image information (Y in S130), in confirming image information to be backed up (S140), the CPU 62 displays pieces of image information to be backed up on the liquid crystal display section 3 in order one by one. In this case, evaluation results (the average edge width WEa or presence or absence of out-of-focus blurring) corresponding to the image information displayed is displayed on the liquid crystal display section 3 on the basis of the evaluation results stored in the memory 64 in S250. The user looks at the evaluation results displayed on the liquid crystal display section 3 and decides, with the operation button 5, whether the image information should be backed up. The user may decide not to perform backup of the image information because, for example, the average edge width WE is large. In this way, in confirming the image information to be backed up (S140), the evaluation results are displayed on the liquid crystal display section 3. Thus, it is possible to present a judgment material to the user. Consequently, useless image information is not written in the CD-R.

Other Embodiments

The embodiment is mainly described about the printer. However, it goes without saying that the embodiment includes disclosure of a computer system, a program, a storage medium having stored the program therein, and the like.

The printer and the like as an embodiment are explained. However, the embodiment is intended to facilitate understanding of the invention and is not intended to interpret the invention in a limited manner. It goes without saying that the invention could be modified and improved without departing from the spirit thereof and the invention includes equivalents thereof. In particular, even embodiments described below are included in the invention.

<Concerning Applied Products>

Although the printer is explained in the embodiment, the invention is not limited to this. For example, the evaluation processing for image information may be performed in a personal computer having image processing software installed therein.

It is possible to perform image correction processing with such image processing software. As correction processing for an image blurred because of out-of-focus blurring, an unsharp mask filter is known. If the image processing software applies the unsharp mask filter to image information, since an edge of an image is emphasized, it is possible to correct the image blurred because of out-of-focus blurring.

When out-of-focus blurring correction is performed, it is desirable to display, for the user, correction results on a display. When out-of-focus blurring correction is performed, an edge of an image is emphasized and a contour of the image is made clear. After correction is performed to make the contour of the image clear in this way, if enlargement/reduction processing is applied to the image information after correction in displaying the image on the display, it is likely that even the contour made clear is magnified to make the displayed image unnatural. As a result, although the image correction is appropriately applied to the original image information, it is likely that the user judges that appropriate image correction is not performed. Therefore, when out-of-focus blurring correction is performed, in displaying the image information after correction, it is desirable to display the image on the display at no magnification without performing the enlargement/reduction processing. Consequently, the user can correctly recognize the image information after correction.

CONCLUSION (1) When photographing is performed in an out-of-focus state, a contour of an image photographed is in a blurred state. This means that, in an image blurred because of out-of-focus blurring, the width of a boundary (an edge) between areas with different darknesses widens. In other words, it is possible to perform the out-of-focus blurring evaluation if a width of an edge in image information is detected.

Thus, the CPU 62 applies the Sobel filter to luminance image information of evaluation image information to be evaluated and calculates an edge gradient image (see S222 in FIG. 7). This makes it possible to extract an edge (a boundary) of an image expressed by the image information. In the edge gradient image, the magnitude "a" of a gradient of an image located in the edge shows a relatively high value. Therefore, the CPU 62 extracts a pixel having the high magnitude "a" of a gradient in the edge gradient image as an edge pixel.

The CPU 62 determines a scan direction according to an edge direction (a direction intersecting with the boundary) (S301 in FIG. 11 or S401 in FIG. 13), performs scanning in one direction to specify a pixel located at an end of the edge (S302 in FIG. 11 or S403 in FIG. 13), and further performs scanning in another direction to specify a pixel located at an end of the edge (S303 in FIG. 11 and S404 in FIG. 13). In order to calculate the edge width WE, the CPU 62 calculates a distance between the two pixels specified (the number of pixels). The CPU 62 calculates the edge widths WE in the respective edge pixels, totals the edge widths WE calculated to calculate the total edge width WEt, and divides the total edge width WEt by the number of edges to calculate the average edge width WEa. If the average edge width WEa is small, the CPU 62 evaluates that the image is not blurred because of out-of-focus blurring. If the average edge width WEa is large, the CPU 62 judges that the image is blurred because of out-of-focus blurring.

Consequently, the CPU 62 can accurately subject image information to the out-of-focus blurring evaluation.

(2) According to the first out-of-focus blurring evaluating method, the CPU 62 specifies a pixel having an extreme value of a luminance out of pixels located in the scan direction with respect to the edge pixel. In other words, according to the first out-of-focus blurring evaluating method, a distance from a pixel having a maximum value of a luminance to a pixel having a minimum value of a luminance is set as the wedge width WE. If the edge width WE is calculated in this way, the edge width WE is small in a state in which an edge of a contour of the image is sharp (see FIG. 12B) and is large in a state of out-of-focus blurring (see FIG. 12D). Thus, it is possible to accurately perform out-of-focus blurring evaluation.

(3) However, when the edge width WE is calculated in this way, it is likely that the CPU 62 misevaluates an image because of the image expressed by the image information. In other words, when a contour of a subject is not in a sharp state from the beginning, regardless of the fact that the image is in focus, since the edge width WE is calculated large (see FIG. 15A), the CPU 62 misevaluates that the image is an image burred because of out-of-focus blurring.

Thus, in the second out-of-focus blurring evaluating method, the CPU 62 specifies, from among pixels located in the scan direction with respect to the edge pixel, pixels for which the difference in luminance between them and each pixel adjacent thereto becomes the largest (see S403 and S404 in FIG. 13 and FIG. 14) and sets a distance between the two specified pixels as the edge width WE. When the edge width WE is calculated in this way, even if a contour of a subject is blurred from the start, if an image of the subject is in focus, it is possible to evaluate that the image is not blurred because of out-of-focus blurring.

(4) According to the embodiment, the Sobel filter is applied to luminance image information of evaluation image information to extract an edge pixel. However, the invention is not limited to this. For example, image information is not limited to the luminance image information and the Sobel filter maybe applied to other kinds of image information. A filter is not limited to the Sobel filter and other edge filters may be applied.

As other filters, for example, a filter that calculates differential in the X and Y directions, respectively, is conceivable. However, if the Sobel filter is applied, it is possible to extract an edge smoothly and control an influence of noise according to a smoothing effect.

(5) According to the embodiment, a pixel, the magnitude "a" of a gradient (a degree of inclination of a luminance) of which exceeds a threshold value, is extracted as an edge pixel. However, the invention is not limited to this. For example, a pixel for which the difference in luminance between it and a pixel adjacent thereto exceeds a threshold value, may be extracted as an edge pixel.

(6) According to the second out-of-focus blurring evaluating method, even a pixel, the magnitude "a" of a gradient of which exceeds a threshold value, is not treated as an edge pixel unless the magnitude "a" of the gradient is not large compared with those of pixels adjacent to the pixel in the scan direction. Thus, the edge width WE is not calculated. It is also possible to apply this processing to the first out-of-focus blurring evaluating method. This makes it possible to calculate the average edge width WEa without taking into account an edge having relatively weak intensity.

(7) In a block in focus most, since a contour of the image is clear, a luminance difference between pixels adjacent to each other is large. Thus, in the embodiment, for each of divided blocks, a total of luminance differences in the block is calculated to extract a block having a largest luminance difference. Consequently, it is possible to extract a part in focus.

In particular, when a subject is photographed with the background other than the subject blurred in order to emphasize the subject, if image evaluation is applied to an entire image, it is likely to be evaluated that out-of-focus blurring has occurred regardless of the fact that the subject is in focus. On the other hand, in the image evaluation, since evaluation is performed in a part in focus most, accuracy of the image evaluation is improved.

(8) In the embodiment of the image processing software, the out-of-focus blurring correction is applied to the image information on the basis of a result of the out-of-focus blurring evaluation. This makes it possible to appropriately apply the out-of-focus blurring correction to evaluation image information.

(9) When image correction is performed, a contour of an image is made clear. However, after such correction is performed, in displaying the image on a display, if enlargement/reduction processing is applied to image information after correction, it is likely that even the contour made clear is magnified and the image displayed is made unnatural. As a result, regardless of the fact that the image correction is appropriately applied to the original image information, it is likely that a user judges that appropriate image correction is not performed. Thus, in the embodiment of the image software, in displaying image information after correction on the display, the image information is displayed at no magnification.

(10) According to the image evaluating method including all the elements described above, all the effects are obtained.

Thus, the image evaluating method is desirable. However, it goes without saying that it is unnecessary to include all the elements.

(11) The program for controlling the printer 1 causes the CPU 62 (an example of an arithmetic processing unit) to acquire evaluation image information, extract plural edge pixels from the evaluation image information, calculate the edge widths WE corresponding to the respective edge pixels, and perform the out-of-focus blurring evaluation on the basis of the average edge width WEa.

The image processing software causes a CPU (an example of an arithmetic processing unit) of a personal computer having this image processing software installed therein to acquire evaluation image information, extract plural edge pixels from the evaluation image information, calculate the edge widths WE corresponding to the respective edge pixels, and perform the out-of-focus blurring evaluation on the basis of the average edge width WEa.

In both the cases, it is possible to accurately evaluate out-of-focus blurring.

(12) The printer 1 (an example of an image-information evaluating apparatus) acquires evaluation image information, extracts plural edge pixels from the evaluation image information, calculates the edge widths WE corresponding to the respective edge pixels, and performs the out-of-focus blurring evaluation on the basis of the average edge width WEa.

A personal computer (an example of an image-information evaluating apparatus) having the image processing software installed therein also acquires evaluation image information, extracts plural edge pixels from the evaluation image information, calculates the edge widths WE corresponding to the respective edge pixels, and performs the out-of-focus blurring evaluation on the basis of the average edge width WEa.

However, the image-information evaluating apparatus is not limited to this. For example, the image-information evaluating apparatus may be a digital camera. In this case, it is desirable that, immediately after an image is photographed, evaluation is applied to the image photographed and an evaluation result is displayed for a photographer. Consequently, the photographer can photograph an image while watching out for out-of-focus blurring or can erase photographed image information.

(13) According to the second out-of-focus blurring evaluating method, the out-of-focus blurring evaluation is performed on the basis of the average edge width WEa. However, the invention is not limited to this. For example, it is also possible that a pixel having a largest gradient is extracted from evaluation image information as an edge pixel, an edge width corresponding to the edge pixel is calculated, and the out-of-focus blurring evaluation is performed on the basis of the edge width calculated. It is possible to accurately perform the out-of-focus blurring evaluation as in the second out-of-focus blurring evaluating method even if a contour of a subject is blurred from the beginning.

What is claimed is:

1. A method of evaluating image information, comprising:
   extracting, by an image processor, an edge pixel from image information to be evaluated;
   determining, by the image processor, a scan direction based on an edge gradient of the image information;
   finding, by the image processor, from among pixels located in a negative direction of the scan direction with respect to the edge pixel, a first pixel for which a difference in luminance between the first pixel and a pixel adjacent thereto is the largest;

finding, by the image processor, from among pixels located in a positive direction of the scan direction with respect to the edge pixel, a second pixel for which a difference in luminance between the second pixel and a pixel adjacent thereto is the largest; and performing out-of-focus blurring evaluation of the image information, by the image processor, on the basis of a distance between the first pixel and the second pixel.

2. An evaluating method according to claim 1, further comprising extracting, by the image processor, the edge pixel by applying a Sobel filter.

3. An evaluating method according to claim 1, further comprising:

calculating, by the image processor, gradients of respective pixels on the basis of the image information; and extracting, by the image processor, a pixel whose magnitude in gradient exceeds a threshold value as the edge pixel.

4. An evaluating method according to claim 1, further comprising extracting, by the image processor, as the edge pixel, a pixel that is located in a boundary of an image expressed by the image information and that has a larger gradient compared with a gradient of a pixel adjacent thereto in a direction intersecting with the boundary.

5. An evaluating method according to claim 1, further comprising:

dividing, by the image processor, the image information into a plurality of areas;

selecting, by the image processor, a specific area from the areas divided; and performing, by the image processor, the out-of-focus blurring evaluation on the specific area selected.

6. An evaluating method according to claim 1, further comprising performing, by the image processor, out-of-focus blurring correction on the image information on the basis of a result of the out-of-focus blurring evaluation.

7. An evaluating method according to claim 6, further comprising displaying, by a display unit, the image information that has been subjected to the out-of-focus blurring correction at no magnification.

8. A storage medium having an image-information evaluating program stored therein, the evaluating program comprising:

a code for causing an arithmetic processing unit to extract an edge pixel from image information to be evaluated;

a code for causing the arithmetic processing unit to determine a scan direction based on an edge gradient of the image information;

a code for causing the arithmetic processing unit to find, from among pixels located in a negative direction of the scan direction with respect to the edge pixel, a first pixel for which a difference in luminance between the first pixel and a pixel adjacent thereto is the largest;

a code for causing the arithmetic processing unit to find, from among pixels located in a positive direction of the scan direction with respect to the edge pixel, a second pixel for which a difference in luminance between the second pixel and a pixel adjacent thereto is the largest; and a code for causing the arithmetic processing unit to perform out-of-focus blurring evaluation of the image information on the basis of a distance between the first pixel and the second pixel.

9. An image-information evaluating apparatus comprising:

a memory for storing image information; and an arithmetic processing unit, the arithmetic processing unit:

extracting an edge pixel from image information to be evaluated, determining a scan direction based on an edge gradient of the image information, finding, from among pixels located in a negative direction of the scan direction with respect to the edge pixel, a first pixel for which a difference in luminance between the first pixel and a pixel adjacent thereto is the largest, finding, from among pixels located in a positive direction of the scan direction with respect to the edge pixel, a second pixel for which a difference in luminance between the second pixel and a pixel adjacent thereto is the largest, and performing out-of-focus blurring evaluation of the image information on the basis of a distance between the first pixel and the second pixel.

10. An image-information evaluating apparatus according to claim 9, wherein the image-information evaluating apparatus is a printing apparatus.

* * * * *